(12) United States Patent
Li et al.

(10) Patent No.: US 8,570,473 B2
(45) Date of Patent: Oct. 29, 2013

(54) DISPLAY SUBSTRATE, LIQUID CRYSTAL DISPLAY PANEL HAVING THE SAME, AND METHOD OF MANUFACTURING THE LIQUID CRYSTAL DISPLAY PANEL

(75) Inventors: Yi Li, Yongin-si (KR); Seong-Jun Lee, Seoul (KR); Jae-Young Lee, Yongin-si (KR); Seon-Hong Ahn, Suwon-si (KR); Sung-Hoon Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 484 days.

(21) Appl. No.: 12/537,595

(22) Filed: Aug. 7, 2009

(65) Prior Publication Data
US 2010/0053528 A1 Mar. 4, 2010

(30) Foreign Application Priority Data

Aug. 27, 2008 (KR) .................................. 2008-84084

(51) Int. Cl.
*G02F 1/1337* (2006.01)
(52) U.S. Cl.
USPC .......................................... 349/130; 349/129

(58) Field of Classification Search
None
See application file for complete search history.

(56) References Cited

U.S. PATENT DOCUMENTS

| 5,953,091 | A * | 9/1999 | Jones et al. ................... 349/129 |
| 6,940,575 | B2 * | 9/2005 | Sunohara et al. ............. 349/142 |
| 2003/0160750 | A1 * | 8/2003 | Ueda et al. ....................... 345/87 |
| 2006/0146243 | A1 * | 7/2006 | Nakanishi et al. ............. 349/139 |
| 2008/0007681 | A1 * | 1/2008 | Chen et al. ..................... 349/129 |
| 2010/0053526 | A1 * | 3/2010 | Kye et al. ....................... 349/124 |
| 2011/0090448 | A1 * | 4/2011 | Nakanishi et al. ............. 349/139 |

\* cited by examiner

*Primary Examiner* — Thanh-Nhan P Nguyen
(74) *Attorney, Agent, or Firm* — Cantor Colburn LLP (57) ABSTRACT

A display substrate includes a base substrate on which a pixel area is defined. The pixel area includes a first sub-pixel area and a second sub-pixel area. A plurality of first electrode portions is disposed at a first interval in the first sub-pixel area, and a plurality of second electrode portions is disposed at a second interval in the second sub-pixel area. The first electrode portion has a first width, and the second electrode portion has a second width. The first width of the first electrode portion is different from the second width of the second electrode portion, or the first interval between adjacent first electrode portions is different from the second interval between adjacent second electrode portions.

21 Claims, 9 Drawing Sheets

DISPLAY SUBSTRATE, LIQUID CRYSTAL DISPLAY PANEL HAVING THE SAME, AND METHOD OF MANUFACTURING THE LIQUID CRYSTAL DISPLAY PANEL

This application claims priority to Korean Patent Application No. 2008-84084, filed on Aug. 27, 2008, and all the benefits accruing therefrom under 35 U.S.C. §119, the contents of which in its entirety are herein incorporated by reference.

BACKGROUND OF THE INVENTION

1. Field of the Invention

This disclosure relates to a display substrate, a liquid crystal display ("LCD") panel having the display substrate, and a method of manufacturing the LCD panel.

2. Description of the Related Art

An LCD apparatus includes a display substrate having a switching element, an opposite substrate facing the display substrate, and a liquid crystal layer interposed between the display substrate and the opposite substrate.

The LCD apparatus displays an image by applying a voltage to the liquid crystal layer and controlling optical transmittance of the liquid crystal layer. In the LCD apparatus, light is transmitted in a direction in which the light is not blocked by liquid crystal molecules of the liquid crystal layer, and thus the viewing angle of the LCD apparatus can be relatively narrow.

In order to widen the viewing angle, various technologies, such as patterned vertical alignment ("PVA") mode, have been developed. In the PVA mode, a unit pixel is divided into a plurality of domains.

In the PVA mode, liquid crystal molecules are vertically aligned with respect to the two substrates. Further, a slit pattern or a protrusion pattern can be disposed on a pixel electrode, and a common electrode disposed facing the pixel electrode, to define a multi-domain structure in the pixel.

In a method of disposing the slit pattern or the protrusion pattern for the multi-domain structure, a patterning process can be used to dispose the slit pattern or the protrusion pattern on the pixel electrode and the common electrode. The patterning process may cause a misalignment between the two substrates, or reduce an aperture ratio, which is a ratio of an area for the transmission of light to an area of a unit pixel. Further, an LCD apparatus operating in the PVA mode may have reduced side visibility relative to a front visibility thereof.

BRIEF SUMMARY OF THE INVENTION

Exemplary embodiments provide a display substrate for improving a side visibility of a liquid crystal display ("LCD') apparatus.

Further, exemplary embodiments provide an LCD panel having the display substrate.

Further still, exemplary embodiments include a method of manufacturing the LCD panel.

The above described and other drawbacks are alleviated by a display substrate including a base substrate on which a pixel area is defined, and a pixel electrode including a plurality of first electrode portions and a plurality of second electrode portions. The pixel area includes a first sub-pixel area and a second sub-pixel area. The first electrode portions are disposed at a first interval in the first sub-pixel area on the base substrate. The first electrode portion has a first width. The second electrode portions are disposed at a second interval in the second sub-pixel area on the base substrate. The second electrode portion has a second width. The first width of the first electrode portion is different from the second width of the second electrode portion, or the first interval between adjacent first electrode portions in the first sub-pixel area is different from the second interval between adjacent second electrode portions in the second sub-pixel area.

In an embodiment, the first width of the first electrode portion in the first sub-pixel area may be larger than the second width of the second electrode portion in the second sub-pixel area.

In an embodiment, the first width may be between about 2.5 micrometers ("μm") to about 8.0 μm, and the second width may be between about 1 μm to about 2.5 μm. The first interval may be equal to or greater than the first width, and the second interval may be equal to or greater than the second width.

In an embodiment, the first interval between adjacent first electrode portions in the first sub-pixel area may be larger than the second interval between adjacent second electrode portions in the second sub-pixel area. The first interval may be about 5 micrometers, and the second interval may be about 3 micrometers.

In an embodiment, the pixel electrode may further include a third electrode portion disposed between the first electrode portion and the second electrode portion that are disposed at a boundary area between the first sub-pixel area and the second sub-pixel area. A third interval between the third electrode portion and the first electrode portion adjacent to the third electrode portion may be smaller than the first interval, and larger than the second interval. The pixel electrode may further include a fourth electrode portion disposed between the second electrode portion and the third electrode portion. A fourth interval between the third electrode portion and the fourth electrode may be smaller than the third interval, and a fifth interval between the fourth electrode portion and the second electrode portion adjacent to the fourth electrode portion may be smaller than the fourth interval. The first to fifth intervals may be about 5.0 micrometers, about 3.0 micrometers, about 4.5 micrometers, about 4.0 micrometers, and about 3.5 micrometers, respectively.

In an embodiment, the pixel electrode may further include a plurality of third electrode portions disposed between the first electrode portion and the second electrode portion that are disposed at a boundary area between the first sub-pixel area and the second sub-pixel area. Intervals between the adjacent third electrode portions may be smaller than the first interval, and larger than the second interval. The intervals between the adjacent third electrode portions may gradually narrow as closer to the second electrode portion disposed at the boundary area between the first sub-pixel area and the second sub-pixel area.

In an embodiment, the pixel electrode may further include a first connection electrode portion electrically connected to the first electrode portions and the second electrode portions.

In an embodiment, the pixel electrode may further include a second connection electrode portion extending in a direction which intersects the first connection electrode portion, wherein the first and second electrode portions may extend in different directions from the first and second connection electrode portions and define a plurality of domains. In an embodiment, an area of the first sub-pixel area may be different from an area of the second sub-pixel area.

In an embodiment, the pixel electrode may further include a second connection electrode portion disposed in the first sub-pixel area, the second connection electrode intersecting the first connection electrode portion; and a third connection electrode portion disposed in the second sub-pixel area, the third connection electrode intersecting the first connection electrode portion, wherein the first and second electrode portions extend in different directions from the first, second, and third connection electrode portions to define a plurality of domains.

Also disclosed is an LCD panel including a display substrate, an opposite substrate facing the display substrate, and a liquid crystal layer interposed between the display substrate and the opposite substrate. The display substrate includes a pixel electrode. The pixel electrode includes a plurality of first electrode portions and a plurality of second electrode portions. The first electrode portions are disposed at a first interval in the first sub-pixel area on the base substrate. The first electrode portion has a first width. The second electrode portions are disposed at a second interval in the second sub-pixel area on the base substrate. The second electrode portion has a second width. The first width of the first electrode portion is different from the second width of the second electrode portion, or the first interval between adjacent first electrode portions in the first sub-pixel area is different from the second interval between adjacent second electrode portions in the second sub-pixel area.

In an embodiment, the first width of the first electrode portion in the first sub-pixel area may be larger than the second width of the second electrode portion in the second sub-pixel area. The first interval between adjacent first electrode portions in the first sub-pixel area may be larger than the second interval between adjacent second electrode portions in the second sub-pixel area.

In an embodiment, the pixel electrode may further include a plurality of third electrode portions disposed between the first electrode portion and the second electrode portion that are disposed at a boundary area between the first sub-pixel area and the second sub-pixel area. Intervals between the adjacent third electrode portions may be smaller than the first interval, and larger than the second interval. The intervals between the adjacent third electrode portions may gradually narrow as closer to the second electrode portion disposed at the boundary area between the first sub-pixel area and the second sub-pixel area.

In an embodiment, the display substrate may further include a first alignment layer aligning liquid crystal molecules of the liquid crystal layer, and a first cured reactive mesogen ("RM") layer disposed between the liquid crystal layer and the first alignment layer, the first cured reactive mesogen layer having a pretilt angle, wherein the opposite substrate includes a second alignment layer aligning the liquid crystal molecules of the liquid crystal layer, and a second cured RM layer disposed between the liquid crystal layer and the second alignment layer, the second cured RM layer having a pretilt angle.

In an embodiment, the display substrate may further include a switching device electrically connected to a gate line and a data line, which are substantially perpendicular to each other, wherein the pixel electrode is electrically connected to the switching device, and may further include a first connection electrode portion electrically connected to the first electrode portions and the second electrode portions, wherein the first electrode portions are disposed in a first sub-pixel area and the second electrode portions are disposed in a second sub-pixel area.

In an embodiment, the pixel electrode may further include a second connection electrode portion extending in a direction which intersects the first connection electrode portion, wherein the first and second electrode portions may extend in different directions from the first and second connection electrode portions and define a plurality of domains. In an embodiment, a size of the first sub-pixel area may be different from a size of the second sub-pixel area.

In an embodiment, the pixel electrode may further include a second connection electrode portion disposed in the first sub-pixel area, the second connection electrode may intersect the first connection electrode portion; and a third connection electrode portion disposed in the second sub-pixel area, the third connection electrode may intersect the first connection electrode portion, wherein the first and second electrode portions may extend in different directions from the first, second and third connection electrode portions and define a plurality of domains.

Also disclosed is a method of manufacturing an LCD panel, the method includes disposing a display substrate, the display substrate including a pixel electrode disposed on a first base substrate and a first alignment layer disposed on the pixel electrode. The pixel electrode including a plurality of first electrode portions and a plurality of second electrode portions. The first electrode portions are disposed at a first interval in the first sub-pixel area on the base substrate. The first electrode portion has a first width. The second electrode portions are disposed at a second interval in the second sub-pixel area on the base substrate. The second electrode portion has a second width. The first width of the first electrode portion is different from the second width of the second electrode portion, or the first interval between adjacent first electrode portions in the first sub-pixel area is different from the second interval between adjacent second electrode portions in the second sub-pixel area. The opposite substrate includes a common electrode and a second alignment layer disposed on the common electrode. The common electrode is disposed on substantially an entire surface of a second base substrate. The method further includes interposing a liquid crystal layer between the display substrate and the opposite substrate, the liquid crystal layer including liquid crystal molecules and a RM mixed with the liquid crystal molecules; and disposing a first cured RM layer and a second cured RM layer on the first alignment layer and the second alignment layer, respectively, by irradiating light on to the liquid crystal layer while operating the liquid crystal layer in a white mode, each of the first and second alignment layers having a pretilt angle.

In an embodiment, the first width of the first electrode portion in the first sub-pixel area may be larger than the second width of the second electrode portion in the second sub-pixel area. The first interval between adjacent first electrode portions in the first sub-pixel area may be larger than the second interval between adjacent second electrode portions in the second sub-pixel area.

In an embodiment, the pixel electrode may further include a plurality of third electrode portions disposed between the first electrode portion and the second electrode portion that are disposed at a boundary area between the first sub-pixel area and the second sub-pixel area. Intervals between the adjacent third electrode portions may be smaller than the first interval, and larger than the second interval. The intervals between the adjacent third electrode portions may gradually narrow as closer to the second electrode portion disposed at the boundary area between the first sub-pixel area and the second sub-pixel area.

According to the present invention, a pixel electrode includes a plurality of first electrode portions and a plurality of second electrode portions to define a multi-domain structure. The first width of the first electrode portion is different from the second width of the second electrode portion, or the first interval between adjacent first electrode portions is different from the second interval between adjacent second electrode portions. Accordingly, a side visibility may be improved. Furthermore, the intervals between the adjacent electrode portions disposed at a boundary area of the domains is gradually changed, so that a texture may be prevented from appearing in the boundary area of the domains.

BRIEF DESCRIPTION OF THE DRAWINGS

The above and other features and advantages of the present invention will become more apparent by describing in detail exemplary embodiments thereof with reference to the accompanying drawings, in which.

The detailed description explains the preferred embodiments, together with advantages and features, by way of example with reference to the drawings.

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Figure 1:
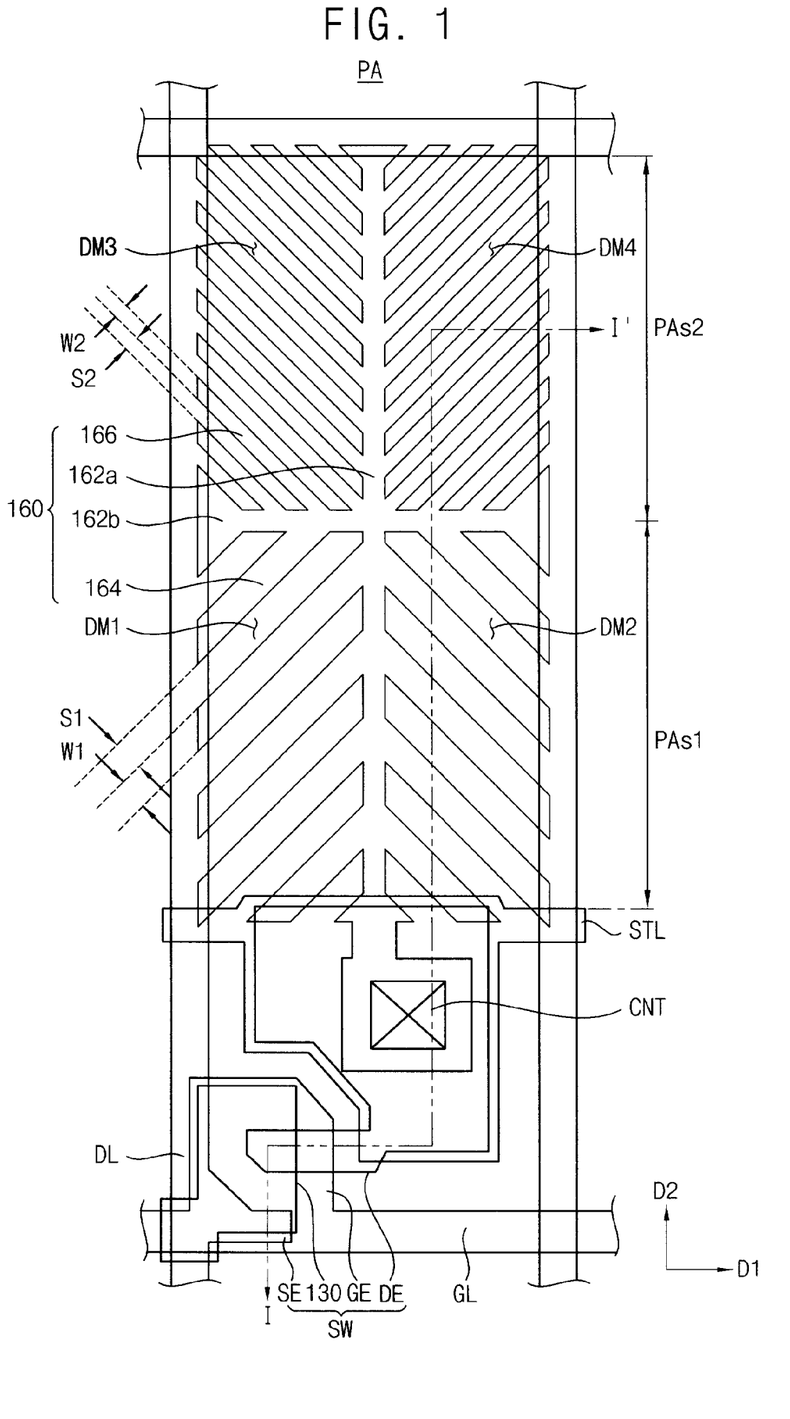
FIG. 1 is a plan view illustrating an exemplary embodiment of a liquid crystal display ("LCD") panel.
Figure 2:
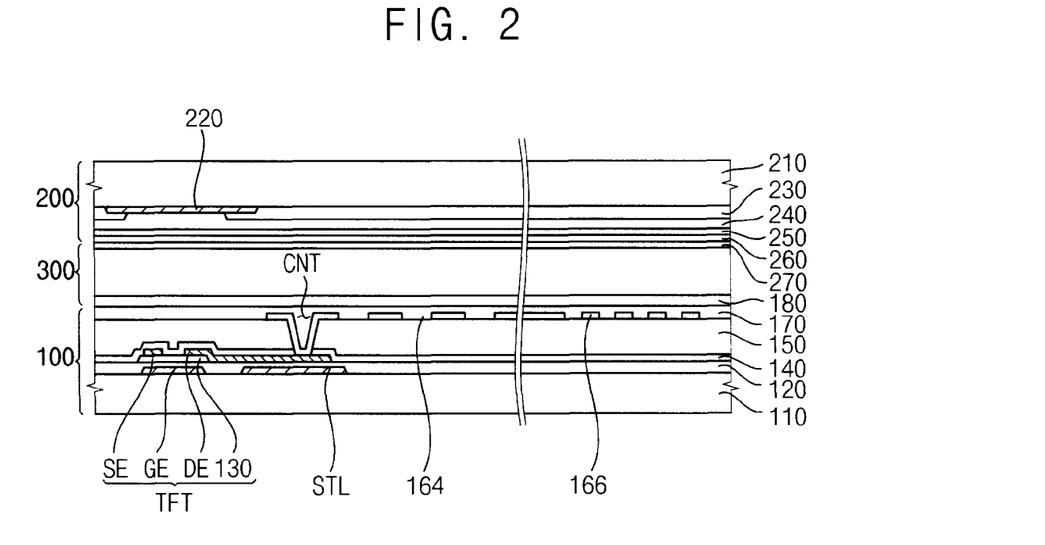
FIG. 2 is a cross-sectional view of the LCD panel taken along line I-I' in FIG. 1.

FIG. 1 is a plan view illustrating an exemplary embodiment of a liquid crystal display ("LCD") panel. FIG. 2 is a cross-sectional view of the LCD panel taken along line I-I' in FIG. 1.

Referring to FIGS. 1 and 2, an LCD panel includes a display panel 100, an opposite substrate 200, and a liquid crystal layer 300.

The display panel 100 includes a first base substrate 110, in which a pixel area PA is defined. The display panel 100 further includes a gate line GL, a storage line STL, a gate insulation layer 120, a data line DL, a thin-film transistor ("TFT") SW, a passivation layer 140, an organic layer 150, a pixel electrode 160, and a first alignment layer 170 on the first base substrate 110.

The gate line GL extends substantially in a first direction D1 on the first base substrate 110.

The storage line STL extends substantially in the first direction D1, and partially overlaps the pixel electrode 160 and a drain electrode DE of the TFT SW. A storage capacitor comprises the storage line STL, the pixel electrode 160, the passivation layer 140, and the gate insulation layer 120, which is disposed between the storage line STL and the pixel electrode 160.

The gate insulation layer 120 is disposed on the first base substrate 110 to substantially cover the gate line GL and the storage line STL.

The data line DL is disposed on the gate insulation layer 120 in a second direction D2, which intersects the first direction D1. The second direction D2 may be substantially perpendicular to the first direction D1.

The TFT SW includes a gate electrode GE electrically connected to the gate line GL, a semiconductor pattern 130 disposed on the gate insulation layer 120 in a location corresponding to a location of the gate electrode GE, a source electrode SE electrically connected to the data line DL, and a drain electrode DE electrically connected to the pixel electrode 160. The source electrode SE and the drain electrode DE are separated from each other on the semiconductor pattern 130. The drain electrode DE is electrically connected to the pixel electrode 160 through the contact hole CNT.

The passivation layer 140 is disposed on the gate insulation layer 120 and substantially covers the data line DL and the TFT SW.

The organic layer 150 is disposed between the passivation layer 140 and the pixel electrode 160 and can planarize the display panel 100.

The pixel electrode 160 is disposed on the organic layer 150 and comprises a transparent conductive material. The pixel electrode 160 is electrically connected to the drain electrode DE of the TFT SW through the contact hole CNT, which is defined by the organic layer 150.

The pixel electrode 160 includes first electrode portions 164 and second electrode portions 166. The pixel electrode 160 may further include a first connection electrode portion 162a and a second connection electrode portion 162b.

The first connection electrode portion 162a may extend in a direction which is substantially parallel with the data line DL. The first connection electrode portion 162a is electrically connected to the drain electrode DE of the TFT SW through the contact hole CNT. The first connection electrode portion 162a electrically connects the first electrode portions 164 to the second electrode portions 166.

The second connection electrode portion 162b may extend in a direction which is substantially perpendicular to the first connection electrode portion 162a and can divide the pixel area PA into a first sub-pixel area PAs1, in which the first electrode portions 164 are disposed, and a second sub-pixel area PAs2, in which the second electrode portions 166 are disposed.

The first electrode portions 164 are disposed in the first sub-pixel area PAs1. The first electrode portions 164 each have a first width W1. The first electrode portions 164 may be disposed at a first interval S1, which can be substantially the same as the first width W1. In an embodiment, the first width W1 of each of the first electrode portions 164 may be between about 1.0 micrometer ("μm") to about 20 μm, specifically between about 2.5 μm to about 8.0 μm, more specifically between about 3.5 μm to about 7.0 μm. In an embodiment, a plurality of slits are disposed wherein an interval between adjacent first electrode portions 164 has a width of about 2 μm, specifically about 3 μm, more specifically about 4 μm.

In an embodiment, the first width W1 of each of the first electrode portions 164 is substantially the same as the first interval S1. In another embodiment, the first width W1 may be equal to or less than the first interval S1.

The second electrode portions 166 are disposed in the second sub-pixel area PAs2. The second electrode portions 166 each have a second width W2, which can be different from the first width W1. The second electrode portions 166 may be disposed at a second interval S2, which can be substantially the same as the second width W2. In an embodiment, the second width W2 of each of the second electrode portions 166 may be between about 0.5 μm to about 5 μm, specifically between about 1.0 μm to about 2.5 μm, more specifically about 2.0 μm. Thus a plurality of slits between adjacent second electrode portions 166 can be disposed with a width between about 0.5 μm to about 5 μm, specifically about 2 μm.

In an embodiment, the second width W2 of the second electrode portion 166 is substantially the same as the second interval S2. Thus, the second width W2 may be equal to or less than the second interval S2.

The first electrode portions 164 and the second electrode portions 166 protrude from the first connection electrode portions 162a and the second connection electrode portions 162b, respectively, and extend toward an edge of the pixel area PA. The pixel area PA is divided into a first domain DM1, a second domain DM2, a third domain DM3, and a fourth domain DM4 by the first and second electrode portions 164 and 166.

The first electrode portions 164 define the first and second domains DM1 and DM2. The first electrode portions 164, which define the first domain DM1, extend in a direction inclined at about 225 degrees with respect to the second connection electrode portion 162b. The first electrode portions 164, which define the second domain DM2, extend in a direction inclined at about 315 degrees with respect to the second connection electrode portion 162b.

The second electrode portions 166 extend in a direction substantially opposite to the direction in which the first electrode portions 164 extend, and define the third and fourth domains DM3 and DM4. In an embodiment, the second electrode portions 166 defining the third domain DM3 may extend in a direction substantially opposite to the direction in which the first electrode portions 164 defining the second domain DM2 extend. The second electrode portions 166 defining the fourth domain DM4 may extend in a direction substantially opposite to the direction in which the first electrode portions 164 defining the first domain DM1 extend. Thus, in an embodiment, the second electrode portions 166 defining the third domain DM3 extend in a direction inclined at about 135 degrees with respect to the second connection electrode portion 162b, and the second electrode portions 166 defining the fourth domain DM4 extend in a direction inclined at about 45 degrees with respect to the second connection electrode portion 162b.

In an embodiment, the area of the first sub-pixel area PAs1 is substantially the same as that of the second sub-pixel area PAs2. The area of the first sub-pixel area PAs1 may be different from the area of the second sub-pixel area PAs2. In an embodiment, the area of the first sub-pixel area PAs1 may be smaller than the area of the second sub-pixel area PAs2. A desirable ratio of the area of the first sub-pixel area PAs1 to the area of the second sub-pixel area PAs2 may be between 0 to about 4, specifically between about 0.5 to about 2, more specifically about 1.

The first alignment layer 170 is disposed on the organic layer 150 to cover the pixel electrode 160.

The opposite substrate 200 is disposed to face the display substrate 100.

The opposite substrate 200 may include a second base substrate 210, a light-blocking pattern 220, a color filter layer 230, an overcoat layer 240, a common electrode 250, and a second alignment layer 260.

The light-blocking pattern 220 is disposed on the second base substrate 210, corresponding to the gate line GL, the data line DL, and the TFT SW.

The color filter layer 230 is disposed on the second base substrate 210, at a location corresponding to a location of the pixel electrode 160. The color filter layer 230 may include red, green, and blue color filters.

The overcoat layer 240 is disposed between the common electrode 250 and the second base substrate 210, on which the light-blocking pattern 220 and the color filter layer 230 are disposed.

The common electrode 250 comprises a transparent conductive material. The common electrode 250 is disposed on the second base substrate 210, on which the overcoat layer 240 is disposed. The common electrode 250 faces the pixel electrode 160, and may be disposed on substantially an entire surface of the second base substrate 210. In an embodiment, a common voltage Vcom is applied to the common electrode 250.

The second alignment layer 260 is disposed on the common electrode 250. The second alignment layer 260 may vertically align liquid crystal molecules of the liquid crystal layer 300.

The liquid crystal layer 300 is interposed between the display substrate 100 and the opposite substrate 200. The liquid crystal layer 300 includes the liquid crystal molecules, and may further include a reactive mesogen ("RM"). The RM is a photosensitive compound. The RM may react to light, such as ultraviolet light, and form a first cured RM layer 180 and a second cured RM layer 270. In an embodiment, when the light is irradiated on to the liquid crystal layer 300 while applying an electric field thereto, the RM included in the liquid crystal layer 300 is cured on the first alignment layer 170 and the second alignment layer 260 to form the first and second cured RM layers 180 and 270, respectively. The first and second cured RM layers 180 and 270 have a pretilt angle.

Each of the display substrate 100 and the opposite substrate 200 may further include a polarization plate (not illustrated). The polarization plate may include a linear polarization plate transmitting linearly polarized light in a selected direction, or a circular polarization plate transmitting circularly polarized light in a selected direction.

In an embodiment, a slit pattern is not disposed on the common electrode 250, and thus a patterning process for the common electrode 250 may be omitted. Therefore, a misalignment between the display substrate 100 and the opposite substrate 200 may be reduced or substantially prevented. Further, the liquid crystal molecules of the liquid crystal layer can have a pretilt angle similar to that in a white mode state, due to the first and second cured RM layers 180 and 270, therefore a response time of the liquid crystal molecules may be improved.

Figure 3A:
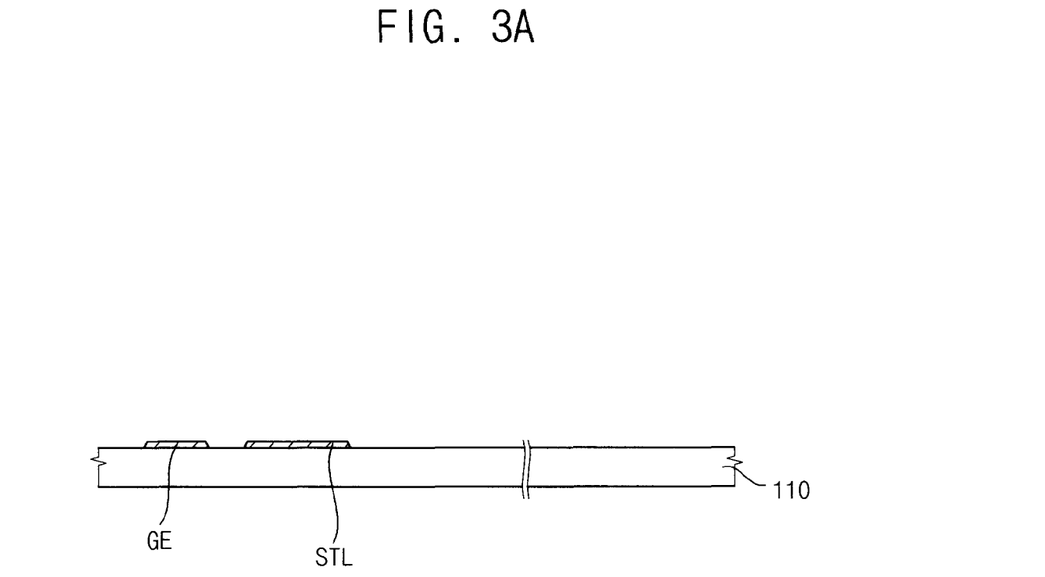
FIGS. 3A to 3C are cross-sectional views illustrating an exemplary embodiment of a display substrate in an exemplary embodiment of a method of manufacturing the display substrate illustrated in FIG. 2.
Figure 3B:
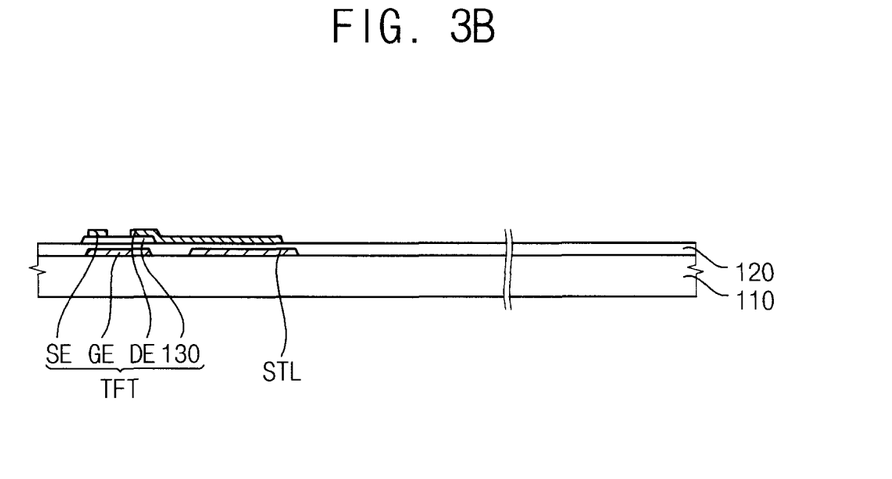
Figure 3C:
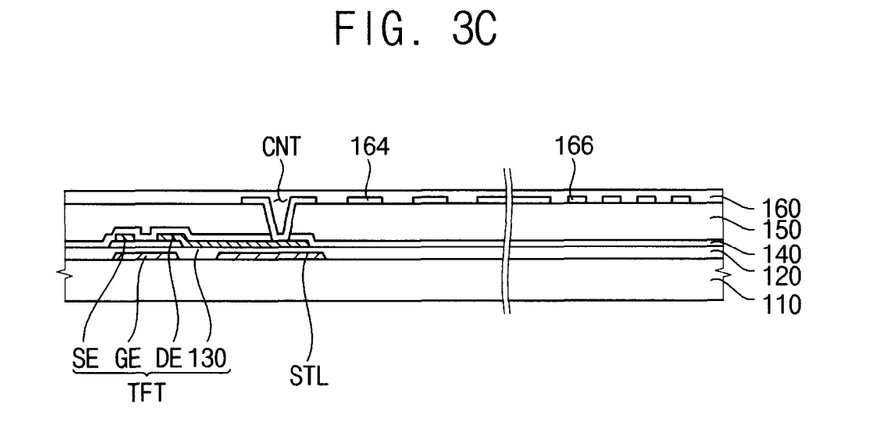

FIGS. 3A to 3C are cross-sectional views illustrating a display substrate in an exemplary embodiment of a method of manufacturing the display substrate illustrated in FIG. 2.

Referring to FIGS. 2 and 3A, a gate metal layer is disposed on the first base substrate 110. The gate metal layer is patterned to dispose a gate metal pattern including the gate line GL1, the gate electrode GE, and the storage line STL.

The gate insulation layer 120 is disposed on the first base substrate 110, on which the gate metal pattern is disposed.

Referring to FIGS. 2 and 3B, the semiconductor pattern 130 is disposed on the first base substrate 110, on which the gate insulation layer 120 is disposed.

A source metal layer is disposed on the first base substrate 110, on which the semiconductor pattern 130 is disposed. The source metal layer can be patterned through a photolithographic process to dispose a source metal pattern, including the data line DL, the source electrode SE, and the drain electrode DE.

Referring to FIGS. 2 and 3C, the passivation layer 140 is disposed on the first base substrate 110, on which the source metal pattern is disposed. The passivation layer 140 may comprise silicon nitride, silicon oxide, or the like, or a combination comprising at least one of the foregoing materials.

The organic layer 150 is disposed on the first base substrate 110, on which the passivation layer 140 is disposed. The organic layer 150 may comprise a positive type photoresist composition.

The passivation layer 140 and the organic layer 150 are etched to dispose the contact hole CNT, exposing the drain electrode DE.

A transparent conductive layer is disposed on the first base substrate 110, on which the contact hole CNT is disposed. The transparent conductive layer is patterned to dispose the pixel electrode 160, including the first and second electrode portions 164 and 166. The transparent conductive layer may comprise indium tin oxide ("ITO"), indium zinc oxide ("IZO"), or the like, or a combination comprising at least one of the foregoing materials.

The pixel electrode 160 includes the first electrode portions 164 and the second electrode portions 166. The first electrode portions 164 are disposed to have a first width W1. The first electrode portions 164 may be disposed at a first interval S1, which is equal to or greater than the first width W1. The second electrode portions 166 are disposed to have a second width W2. A plurality of the second electrode portions 166 may be disposed at a second interval S2, which is equal to or greater than the second width W2. The first alignment layer is disposed on the first base substrate 110, on which the pixel electrode 160 is disposed.

Figure 4A:
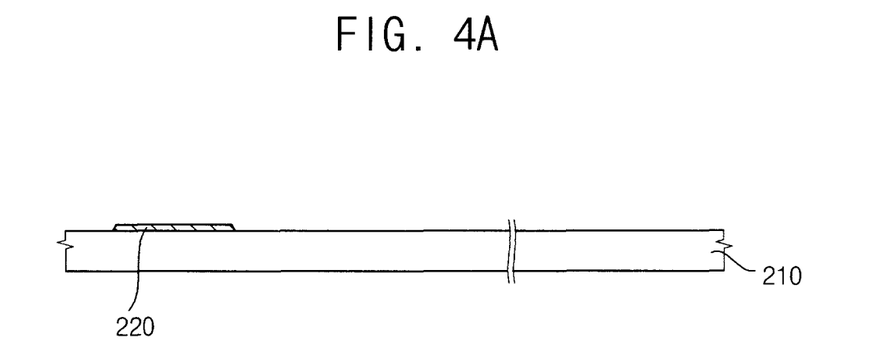
FIGS. 4A to 4C are cross-sectional views illustrating an exemplary embodiment of an opposite substrate in a method of manufacturing the opposite substrate illustrated in FIG. 2.
Figure 4B:
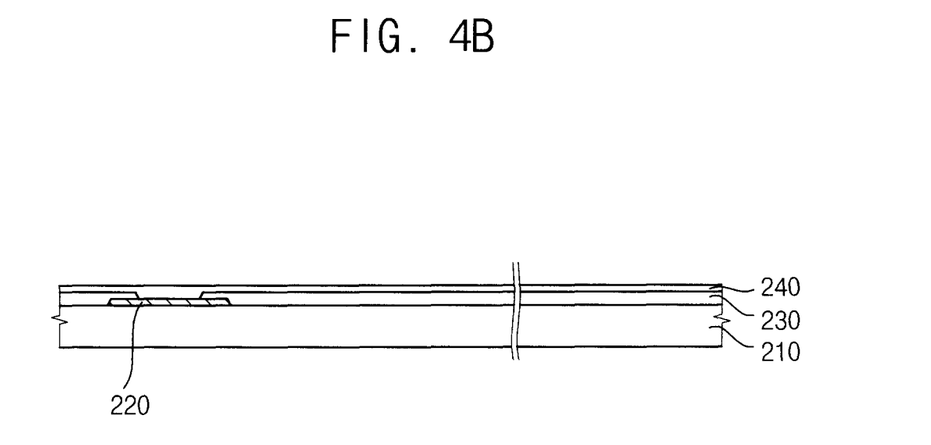
Figure 4C:
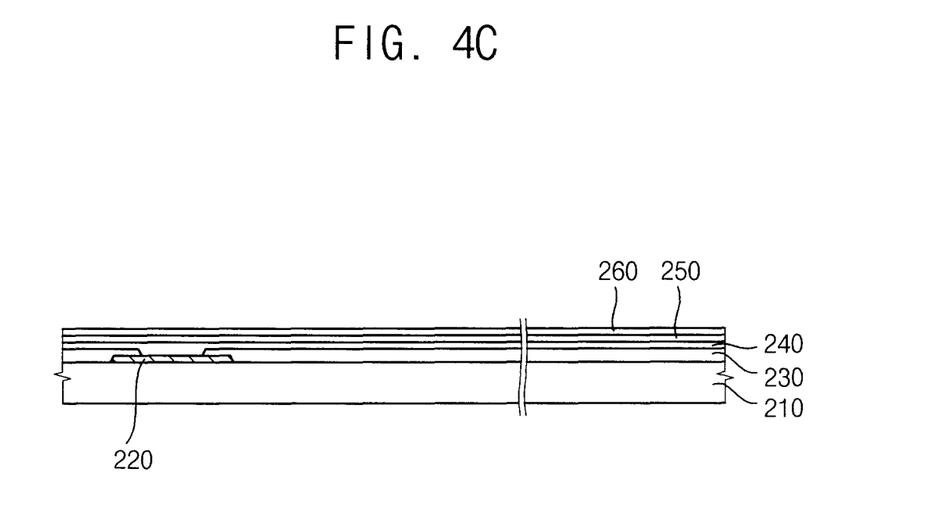

FIGS. 4A to 4C are cross-sectional views illustrating an opposite substrate in an exemplary embodiment of a method of manufacturing the opposite substrate illustrated in FIG. 2.

Referring to FIGS. 2 and 4A, the light-blocking layer 220 is disposed on the second base substrate 210, corresponding to the gate line GL, the data line DL, and the TFT SW.

Referring to FIGS. 2 and 4B, the color filter layer 230 is disposed on the second base substrate 210, on which the light-blocking layer 220 is disposed. The color filter layer 230 may include red, green, and blue color filters.

The overcoat layer 240 is disposed on the second base substrate 210, on which the color filter layer 230 is disposed.

The overcoat layer 240 compensates for a step difference of the color filter layer 230 to planarize the second base substrate 210.

Referring to FIGS. 2 and 4C, the common electrode 250, comprising a transparent conductive material, is disposed on the second base substrate 210, on which the overcoat layer 240 is disposed. The common electrode 250 is not patterned, and is disposed on substantially the entire surface of the second base substrate 210. The second alignment layer 260 is disposed on the common electrode 250. The second alignment layer 260 may vertically align the liquid crystal molecules of the liquid crystal layer 300.

Figure 5:
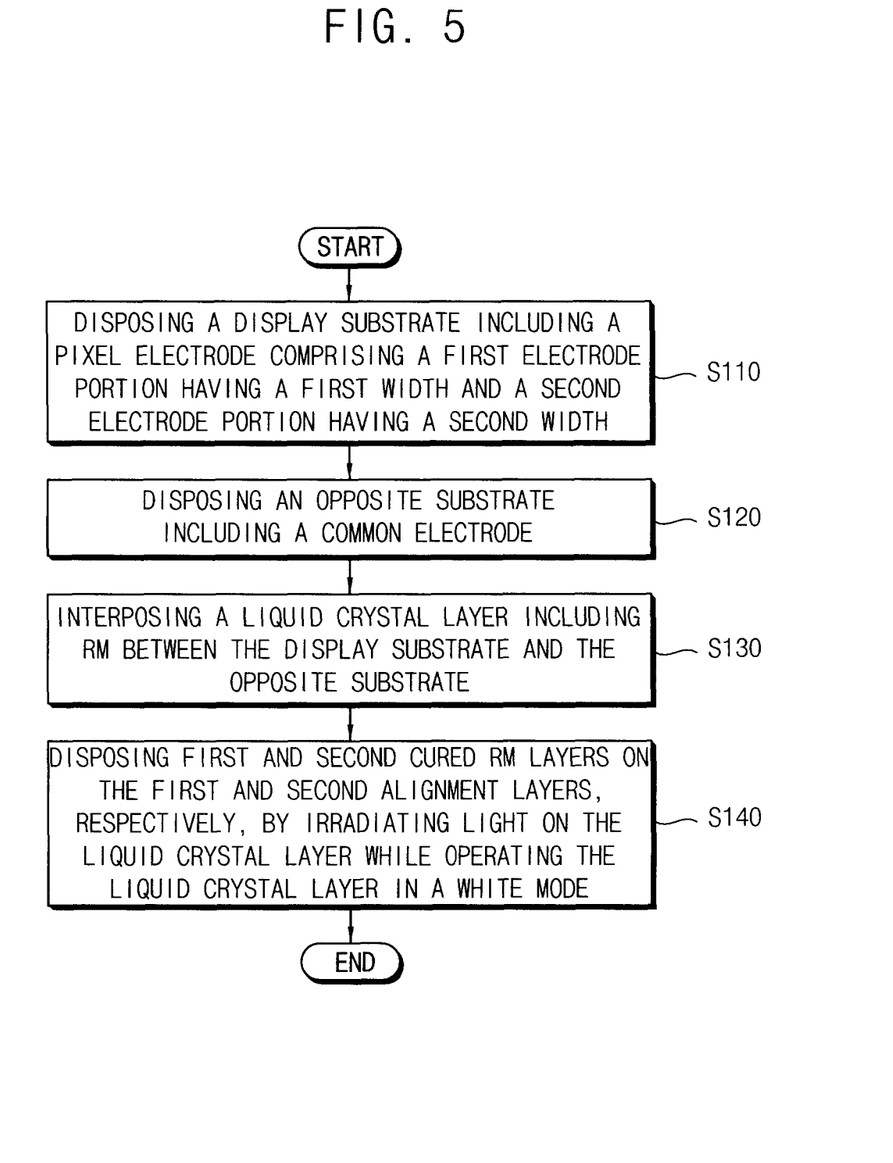
FIG. 5 is a flowchart of an exemplary embodiment of a method of manufacturing the LCD panel illustrated in FIG. 2.

FIG. 5 is a flowchart of an exemplary embodiment of a method of manufacturing the LCD panel illustrated in FIG. 2.

Referring to FIGS. 3A to 3C and 5, the display substrate 100, including the pixel electrode 160 disposed on the first base substrate 110, is disposed (block S110). The pixel electrode 160 includes the first electrode portions 164 and the second electrode portions 166. The first electrode portions 164 each have a first width W1, and the first electrode portions 164 may be disposed at a first interval S1, which can be substantially the same as the first width W1. The second electrode portions 166 each have a second width W2, and the second electrode portions 166 may be disposed at a second interval S2, which can be substantially the same as the second width W2.

Referring to FIGS. 4A to 4C and 5, the opposite substrate 200, including the common electrode 250, is disposed on substantially the entire surface of the second base substrate 210, on which the light-blocking layer 220 and the color filter layer 230 are disposed (block S120).

Referring to FIGS. 2 and 5, the display substrate 100 and the opposite substrate 200 are combined. The liquid crystal molecules and the RM may be injected between the combined display substrate 100 and opposite substrate 200 to dispose the liquid crystal layer 300 (block S130).

While a data voltage for displaying a full white image is applied to the pixel electrode 160 and a common voltage is applied to the common electrode 250 (i.e., while operating the liquid crystal layer 300 in a white mode), light is irradiated on to the liquid crystal layer 300 to cure the RM. The RM is cured to dispose the first cured RM layer 180 and the second cured RM layer 270, each having a pretilt angle on the first alignment layer 170 and the second alignment layer 260, respectively (block S140). Since the first and second cured RM layers 180 and 270 have the pretilt angle, the liquid crystal molecules of the liquid crystal layer 300 are pretilted even when an electric field is not applied to the liquid crystal layer 300.

Figure 6:
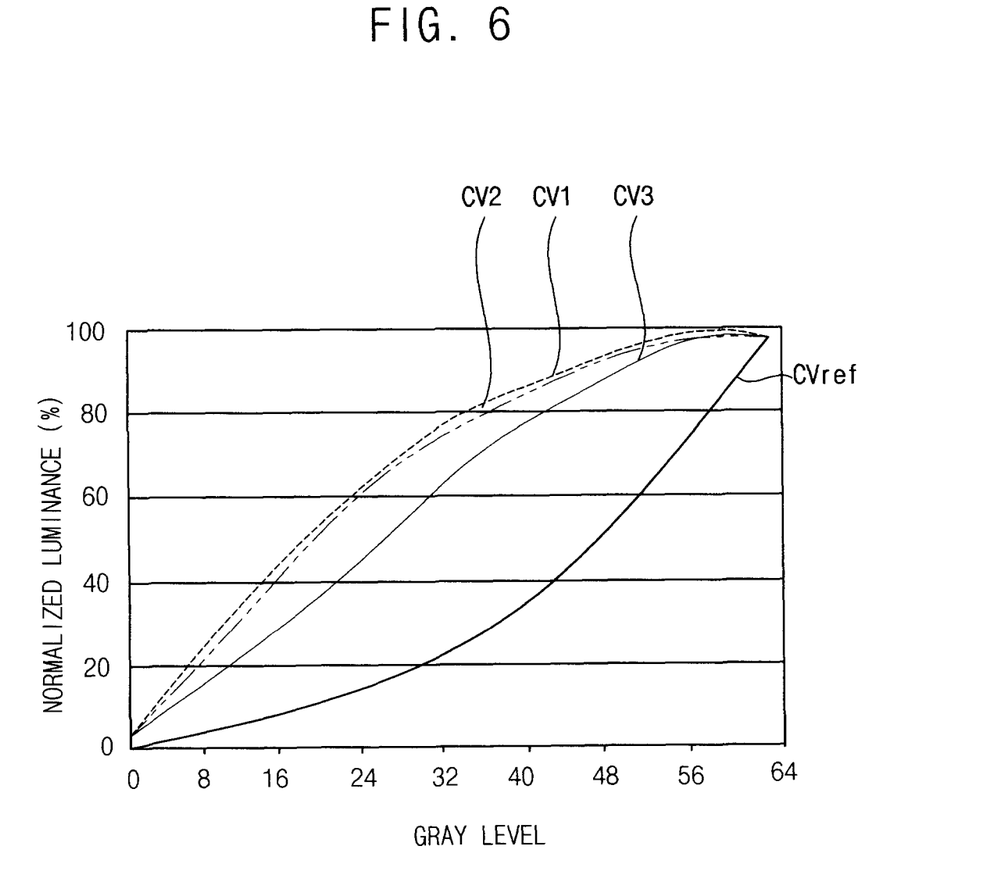
FIG. 6 is a graph illustrating normalized luminance with respect to gray level of an exemplary embodiment of an LCD.

FIG. 6 is a graph illustrating normalized luminance with respect to gray level corresponding to an exemplary embodiment of an LCD, thus FIG. 6 describes an improvement of side visibility.

Referring to FIG. 6, a horizontal axis (x-axis) represents gray levels of an image (for example, 64 gray levels), and a vertical axis (y-axis) represents normalized luminance (or transmittance). A reference curve CVref is a gamma curve when front visibility is optimized. A first curve CV1 is a gamma curve of an LCD panel including a first-type pixel electrode observed at a first side (60, 0). A second curve CV2 is a gamma curve of an LCD panel including a second-type pixel electrode observed at the first side (60, 0). A third curve CV3 is a curve that represents the luminance distribution of distribution of an LCD panel including a third-type pixel electrode observed at the first side (60, 0). The first-type pixel electrode includes a plurality of electrode portions each having a width of about 2 μm and disposed at an interval of about 2 μm. The second-type pixel electrode includes a plurality of electrode portions each having a width of about 3 μm and disposed at an interval of about 3 μm. The third-type pixel electrode is a pixel electrode in accordance with an exemplary embodiment. As described with reference to FIG. 2, the third-type pixel electrode includes the first electrode portions 164 and the second electrode portions 166. Each of the first electrode portions 164 has a width of about 3 μm, and the first electrode portions 164 are disposed at an interval of about 3 μm. Each of the second electrode portions 166 has a width of about 2 μm, and the second electrode portions 166 are disposed at an interval of about 2 μm.

As described with reference to FIG. 6, it can be seen that the third curve CV3 of the LCD panel including the third-type pixel electrode further approaches the reference curve CVref, which corresponds to optimized front visibility, compared to the first and second curves CV1 and CV2, which include the first and second-type pixel electrodes, respectively. Thus, in an embodiment, the side visibility of the LCD panel including the third-type pixel electrode is further improved, compared to the side visibility of the LCD panels including the first and second-type pixel electrodes, respectively.

Table 1 shows indexes of side visibility of the LCD panels including the first, second and third-type pixel electrodes, respectively, according to a simulation.

TABLE 1

| Type of Pixel Electrode | First Side (60, 0) | Second Side (60, 45) | Third Side (60, 90) |
| --- | --- | --- | --- |
| First-type | 0.47 | 0.52 | 0.47 |
| Second-type | 0.45 | 0.53 | 0.43 |
| Third-type | 0.35 | 0.49 | 0.38 |

Table 1 shows indexes of side visibility when the LCD panels include circular polarization plates and are observed at a first side angle (60, 0), a second side angle (60, 45) and a third side angle (60, 90), respectively. The first side angle (60, 0) is $\phi=60$ degrees and $\theta=$zero, and the second side angle (60, 45) is $\phi=60$ degrees and $\theta=45$ degrees. The third side angle (60, 90) is $\phi=60$ degrees and $\theta=90$ degrees. The angles $\phi$ and $\theta$ are defined as follows. When the LCD panel is disposed on an x-y plane in a three-dimensional space comprising an x-axis, a y-axis and a z-axis, $\phi$ is an angle from the x-axis to a plane comprising an observing direction and the z-axis, and $\theta$ is an angle from the z-axis to the observing direction. The index (D) of side visibility is calculated according to Equation 1.

$$D(\theta, \phi) = \left( \frac{|\Delta B_{i,j} \text{front} - \Delta B_{i,j} \text{side}|}{\Delta B_{i,j} \text{front}} \right) \quad \text{Equation 1}$$

The term "$\Delta B_{i,j}$ front" represents a luminance difference between an i-th gray level and a j-th gray level observed from the front, and the term "$\Delta B_{i,j}$ side" represents a luminance difference between an i-th gray level and a j-th gray level observed from a side. The index (D) of side visibility becomes smaller as the difference between the luminance difference ($\Delta B_{i,j}$ front) of the gray levels observed from the front and the luminance difference ($\Delta B_{i,j}$ side) of the gray levels observed from a side becomes smaller. A smaller index (D) of side visibility can be desirable.

As shown in Table 1, the index of side visibility of the LCD panel, including the third-type pixel electrode, is the smallest. That is, when the LCD employs the structure of the pixel electrode 160, according to an exemplary embodiment, the side visibility may be improved.

Figure 7:
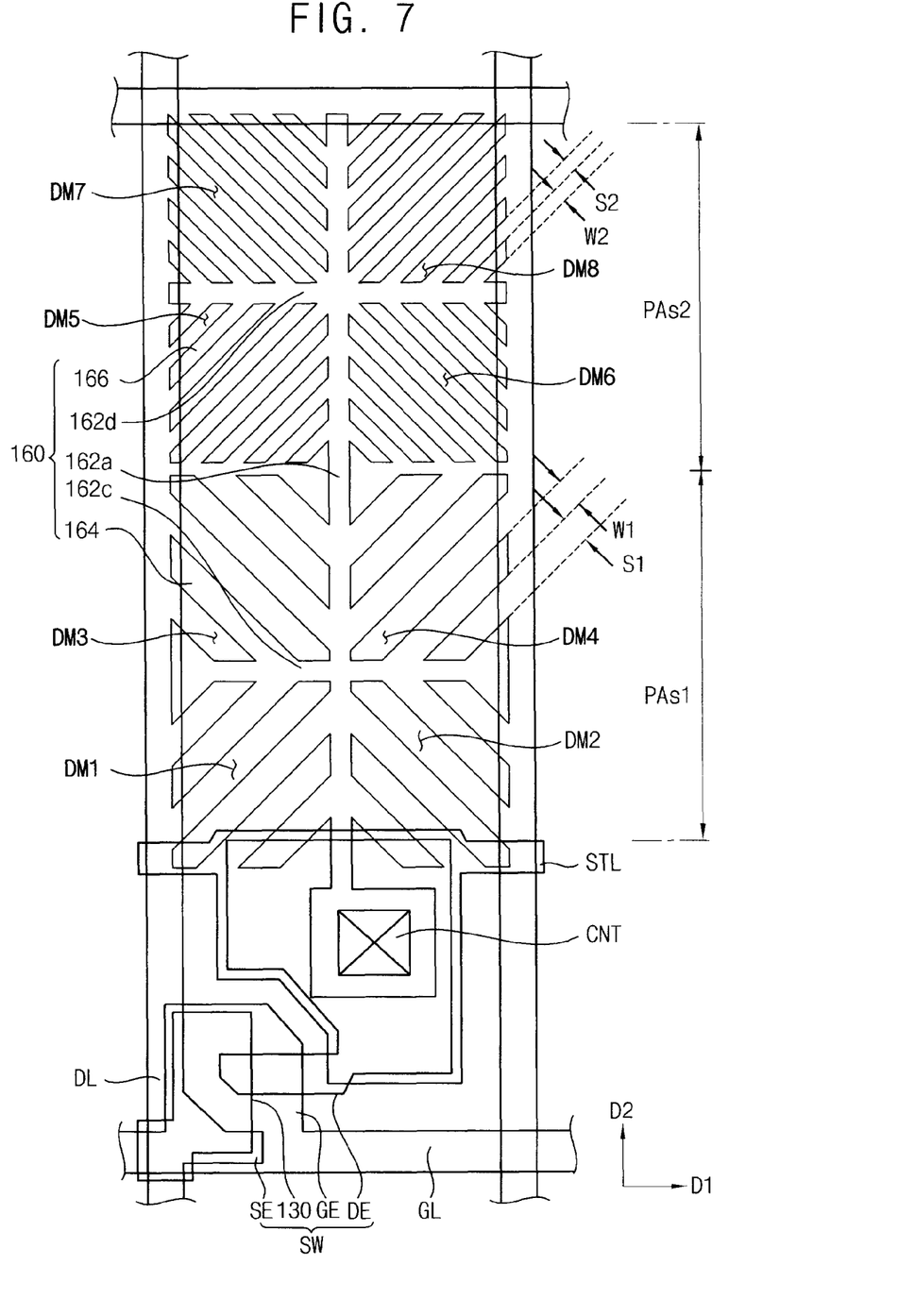
FIG. 7 is a plan view illustrating a display substrate in accordance with another exemplary embodiment.

FIG. 7 is a plan view illustrating a display substrate in accordance with another exemplary embodiment.

The display substrate described with reference to FIG. 7 may be substantially the same as the display substrate described with reference to FIGS. 1 and 2 except that a pixel area PA is divided into eight domains by a pixel electrode 160. Therefore, the same reference numbers are used for the same or similar elements, and any further descriptions concerning the same or similar elements, as those shown in FIGS. 1 and 2, are omitted.

Referring to FIG. 7, the pixel area PA includes a first sub-pixel area PAs1 and a second sub-pixel area PAs2. The pixel electrode 160 is disposed in the pixel area PA. The pixel electrode 160 includes a first connection electrode portion 162a, a second connection electrode portion 162c, a third connection electrode portion 162d, a plurality of first electrode portions 164, and a plurality of second electrode portions 166.

The first connection electrode portion 162a may extend in a direction substantially parallel with the data line DL. The first connection electrode portion 162a is electrically connected to the drain electrode DE of the TFT SW through the contact hole CNT. The first connection electrode portion 162a electrically connects the first electrode portions 164 disposed in the first sub-pixel area PAs1 to the second electrode portions 166 disposed in the second sub-pixel area PAs2.

The second connection electrode portion 162c is disposed in the first sub-pixel area PAs1 and may extend in a direction substantially perpendicular to the first connection electrode portion 162a. The first electrode portions 164 extend from the first connection electrode portion 162a and the second connection electrode portion 162c in different directions, and define a first domain DM1, a second domain DM2, a third domain DM3, and a fourth domain DM4. In an embodiment, the first electrode portions 164 defining the first domain DM1 extend in a direction inclined at about 225 degrees with respect to the second connection electrode portion 162c. The first electrode portions 164 defining the second domain DM2 extend in a direction inclined at about 315 degrees with respect to the second connection electrode portion 162c. The first electrode portions 164 defining the third domain DM3 extend in a direction inclined at about 135 degrees with respect to the second connection electrode portion 162c. The first electrode portions 164 defining the fourth domain DM4 extend in a direction inclined at about 45 degrees with respect to the second connection electrode portion 162c.

The third connection electrode portion 162d is disposed in the second sub-pixel area Pas2 and may extend in the direction substantially perpendicular to the first connection electrode portion 162a. The second electrode portions 166 extend from the first connection electrode portion 162a and the third connection electrode portion 162d in different directions, and define a fifth domain DM5, a sixth domain DM6, a seventh domain DM7, and a eighth domain DM8. In an embodiment, the second electrode portions 166 defining the fifth domain DM5 extend in a direction inclined at about 225 degrees with respect to the third connection electrode portion 162d. The second electrode portions 166 defining the sixth domain DM6 extend in a direction inclined at about 315 degrees with respect to the third connection electrode portion 162d. The second electrode portions 166 defining the seventh domain DM7 extend in a direction inclined at about 135 degrees with respect to the third connection electrode portion 162d. The second electrode portions 166 defining the eighth domain DM8 extend in a direction inclined at about 45 degrees with respect to the third connection electrode portion 162d.

As described above, when the LCD employs the structure of the pixel electrode 160 additional domains may be disposed, thus the side visibility may be further improved.

In an embodiment, the area of the first sub-pixel area PAs1 is substantially the same as that of the second sub-pixel area PAs2. In an embodiment, the area of the first sub-pixel area PAs1 may be smaller than the area of the second sub-pixel area PAs2.

A method of manufacturing the display substrate described with reference to FIG. 7 may be substantially the same as the method of manufacturing the display substrate described with reference to FIGS. 3A to 3C except that each of the first and second electrode portions 164 and 166 includes four sub-electrode portions, each of which can extend in a different direction. Therefore, the same reference numbers are used for the same or similar elements, and any further descriptions concerning the same or similar elements as those shown in FIGS. 3A to 3C are omitted.

Figure 8:
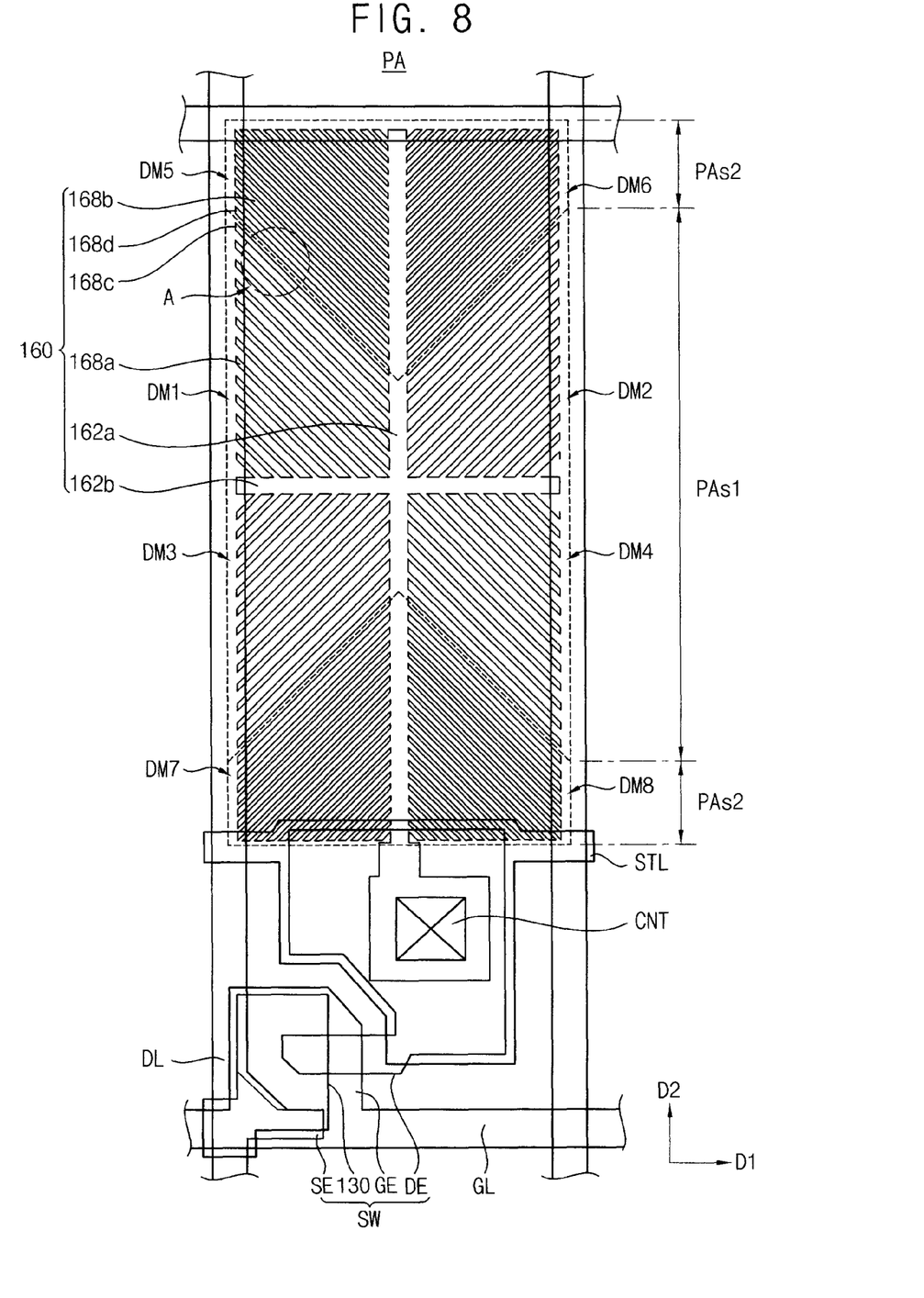
FIG. 8 is a plan view illustrating a display substrate in accordance with still another exemplary embodiment.
Figure 9:
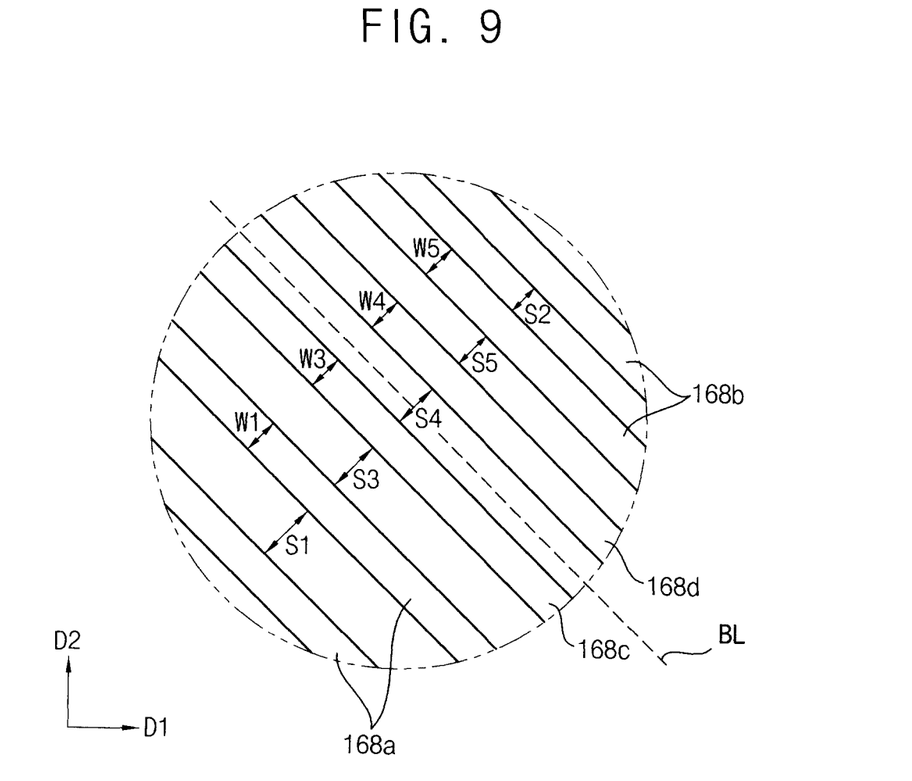
FIG. 9 is a plan view enlarging the portion "A" of FIG. 8.

FIG. 8 is a plan view illustrating a display substrate in accordance with still another exemplary embodiment. FIG. 9 is a plan view enlarging the portion "A" of FIG. 8.

The display substrate described with reference to FIGS. 8 and 9 may be substantially the same as the display substrate described with reference to FIGS. 1 and 2 except that an interval between pixel electrode portions disposed in a boundary area between a first sub-pixel area and a second sub-pixel area. Therefore, the same reference numbers are used for the same or similar elements, and any further descriptions concerning the same or similar elements, as those shown in FIGS. 1 and 2, are omitted.

Referring to FIGS. 8 and 9, the display substrate includes a gate line GL, a data line DL, a thin film transistor SW and a pixel electrode 160. The pixel electrode 160 is formed in a pixel area PA of the display substrate.

The pixel area PA includes a first sub-pixel area PAs1 and a second sub-pixel area PAs2.

The pixel electrode 160 includes a first connection electrode portion 162a, a second connection electrode portion 162b, a plurality of first electrode portions 168a, a second electrode portions 168b, a third electrode portion 168c and a fourth electrode portion 168d. The first electrode portions 168a are formed in the first sub-pixel area PAs1, and the second electrode portions 168b are formed in the second sub-pixel area PAs2. The third electrode portion 168c and the fourth electrode portion 168d may be formed in a boundary area between the first sub-pixel area PAs1 and the second sub-pixel area PAs2.

The first connection electrode portion 162a extends in the second direction D2 in which the data line DL extends, and the second connection electrode portion 162b extends in the first direction D1 in which the gate line GL extends. The first connection electrode portion 162a may intersect with the second connection electrode portion 162b.

The first electrode portions 168a extend from the first connection electrode portion 162a and the second connection electrode portion 162b in directions different from the first direction D1 and the second direction D2, and define a first domain DM1, a second domain DM2, a third domain DM3, and a fourth domain DM4. For example, the first electrode portions 168a defining the first domain DM1 may extend in a direction anticlockwise inclined at about 45 degrees with respect to the first connection electrode portion 162a. The first electrode portions 168a defining the second domain DM2 may extend in a direction clockwise inclined at about 45 degrees with respect to the first connection electrode portion 162a. The first electrode portions 168a defining the third domain DM3 extend in a direction anticlockwise inclined at about 135 degrees with respect to the first connection electrode portion 162a. The first electrode portions 168a defining the fourth domain DM4 extend in a direction clockwise inclined at about 135 degrees with respect to the first connection electrode portion 162a.

The second electrode portions 168b extend from the first connection electrode portion 162a and the second connection electrode portion 162b in directions different from the first direction D1 and the second direction D2, and define a fifth domain DM5, a sixth domain DM6, a seventh domain DM7, and a eighth domain DM8. For example, the fi second electrode portions 168b defining the fifth domain DM5 may extend in a direction anticlockwise inclined at about 45 degrees with respect to the first connection electrode portion 162a. The second electrode portions 168b defining the sixth domain DM6 may extend in a direction clockwise inclined at about 45 degrees with respect to the first connection electrode portion 162a. The second electrode portions 168b defining the seventh domain DM7 extend in a direction anticlockwise inclined at about 135 degrees with respect to the first connection electrode portion 162a. The second electrode portions 168b defining the eighth domain DM8 extend in a direction clockwise inclined at about 135 degrees with respect to the first connection electrode portion 162a.

In the embodiment described in FIGS. 8 and 9, a first interval S1 between adjacent first electrode portions 168a is larger than a second interval S2 between adjacent second electrode portions 168b.

The third electrode portion 168c and the fourth electrode portion 168d may be successively disposed between the first electrode portion 168a and the second electrode portion 168b that are disposed in a boundary area of different domains. For example, the third electrode portion 168c and the fourth electrode portion 168d may be disposed at a boundary between the first domain DM1 and the fifth domain DM5. Likewise, the third electrode portion 168c and the fourth electrode portion 168d may be disposed at a boundary between the second domain DM2 and the sixth domain DM6, a boundary between the third domain DM3 and the seventh domain DM7, and a boundary between the fourth domain DM4 and the eighth domain DM8.

The first electrode portions 168a each have a first width W1. The first electrode portions 168a may be disposed at a first interval S1. In an embodiment, the first width W1 of each of the first electrode portions 168a may be about 3.0 micrometer ("µm"), and the first interval S1 may be about 5.0 µm. The second electrode portions 168b each have a second width W2. The second electrode portions 168b may be disposed at a second interval S2 smaller than the first interval S1. In an embodiment, the second interval S2 may be about 3.0 µm. In an embodiment, the second width W2 may be substantially the same as the first width W1.

The third electrode portion 168c has a third width W3, and the fourth electrode portion 168d has a fourth width W4. The third width W3 may be substantially the same as the fourth width W4.

The third electrode portion 168c is spaced apart from the first electrode portions 168a at a third interval S3. The third interval S3 is smaller than the first interval S1, and larger than the second interval S2. The fourth electrode portion 168d is spaced apart from the third electrode portion 168c at a fourth interval S4, and spaced apart from the second electrode portion 168b at a fifth interval S5. The fourth interval S4 is smaller than the third interval S3, and larger than the second interval S2. The fifth interval S5 is smaller than the fourth interval S4, and larger than the second interval S2. Accordingly, an interval between adjacent electrode portions disposed in the boundary area of the first and second sub-pixel areas PAs1 and PAs2 gradually narrows as closer to the second electrode portions 168b. In an embodiment, the third interval S3 may be about 4.5 µm, the fourth interval S4 may be about 4.0 µm. The fifth interval S5 may be about 3.5 µm.

When the interval between the first electrode portion 168a and the second electrode portion 168b is abruptly changed in the boundary area of the domains, directivity of liquid crystal molecules disposed in the boundary area of the domains becomes unstable. Accordingly, a texture may appear in the boundary area of the domains.

According to one example embodiment of the present invention, the third electrode portion 168c and the fourth electrode portion 168d may be disposed between the first electrode portion 168a and the second electrode portion 168b, so that the interval between adjacent electrode portions disposed in the boundary area of the domain may be gradually changed. Accordingly, a direction of an electric field may be gradually changed from a direction of an electric field generated by the first electrode portion 168a to a direction of an electric field generated by the second electrode portion 168b. Therefore, arrangement directions of the liquid crystal molecules disposed in the boundary area of the domains may be gradually changed, and the texture may be prevent from appearing.

In the embodiment described in FIGS. 8 and 9, two electrode portions are disposed between the first electrode portion 168a and the second electrode portion 168b, but the present invention is not limited to this structure. In another embodiment, the fourth electrode portion 168d may be omitted. Alternatively, further electrode portions in addition to the third electrode portion 168c and the fourth electrode portion 168d may be disposed between the first electrode portion 168a and the second electrode portion 168b to further gradually change the interval between adjacent electrode portions disposed in the boundary are of the domains.

A method of manufacturing the display substrate described with reference to FIG. 8 may be substantially the same as the method of manufacturing the display substrate described with reference to FIGS. 3A to 3C except that an interval between pixel electrode portions disposed in a boundary area between a first sub-pixel area and a second sub-pixel area. Therefore, any further descriptions are omitted.

In an embodiment, a width of the first electrode portion in a first domain is different from a width of the second electrode portion in a second domain. In another embodiment, an interval between the first electrode portions in a first domain is different from an interval between of the second electrode portions in a second domain. Accordingly, side visibility may be improved.

The foregoing is illustrative of the present disclosure and is not to be construed as limiting thereof. Although embodiments have been described, those skilled in the art will readily appreciate that many modifications of the disclosed embodiments are possible without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. Embodiments are defined by the following claims, with equivalents of the claims to be included therein.

What is claimed is:

1. A display substrate comprising:
a base substrate on which a pixel area is defined, the pixel area including a first sub-pixel area and a second sub-pixel area; and
a pixel electrode including
a plurality of first electrode portions disposed at a first interval in the first sub-pixel area on the base substrate, the first electrode portion having a first width;
a plurality of second electrode portions disposed at a second interval in the second sub-pixel area on the base substrate, the second electrode portion having a second width;
a first connection electrode portion electrically and directly connected to the first electrode portions and the second electrode portions; and
a second connection electrode portion extending in a direction which intersects the first connection electrode portion and does not overlap a storage line,
wherein the first width of the first electrode portion is different from the second width of the second electrode portion, or the first interval between adjacent first electrode portions in the first sub-pixel area is different from the second interval between adjacent second electrode portions in the second sub-pixel area,
wherein a boundary defined by terminal ends of the first electrode portions in the first sub-pixel area and by terminal ends of the second electrode portions in the second sub-pixel area has a substantially rectangular shape, and
wherein the first and second electrode portions extend in different directions from the first and second connection electrode portions and define a plurality of domains.

2. The display substrate of claim 1, wherein the first width of the first electrode portion in the first sub-pixel area is larger than the second width of the second electrode portion in the second sub-pixel area.

3. The display substrate of claim 2, wherein the first width is between about 2.5 micrometers to about 8.0 micrometers, and the second width is between about 1 micrometer to about 2.5 micrometers.

4. The display substrate of claim 2, wherein the first interval is equal to or greater than the first width, and the second interval is equal to or greater than the second width.

5. The display substrate of claim 1, wherein the first interval between adjacent first electrode portions in the first sub-pixel area is larger than the second interval between adjacent second electrode portions in the second sub-pixel area.

6. The display substrate of claim 5, wherein the first interval is about 5 micrometers, and the second interval is about 3 micrometers.

7. The display substrate of claim 5, wherein the pixel electrode further includes a third electrode portion disposed between the first electrode portion and the second electrode portion that are disposed at a boundary area between the first sub-pixel area and the second sub-pixel area,
wherein a third interval between the third electrode portion and the first electrode portion adjacent to the third electrode portion is smaller than the first interval, and larger than the second interval.

8. The display substrate of claim 7, wherein the pixel electrode further includes a fourth electrode portion disposed between the second electrode portion and the third electrode portion,
wherein a fourth interval between the third electrode portion and the fourth electrode is smaller than the third interval, and a fifth interval between the fourth electrode portion and the second electrode portion adjacent to the fourth electrode portion is smaller than the fourth interval.

9. The display substrate of claim 8, wherein the first to fifth intervals are about 5.0 micrometers, about 3.0 micrometers, about 4.5 micrometers, about 4.0 micrometers, and about 3.5 micrometers, respectively.

10. The display substrate of claim 5, wherein the pixel electrode further includes a plurality of third electrode portions disposed between the first electrode portion and the second electrode portion that are disposed at a boundary area between the first sub-pixel area and the second sub-pixel area,
wherein intervals between the adjacent third electrode portions are smaller than the first interval, and larger than the second interval,
wherein the intervals between the adjacent third electrode portions gradually narrow as closer to the second electrode portion disposed at the boundary area between the first sub-pixel area and the second sub-pixel area.

11. The display substrate of claim 1, wherein an area of the first sub-pixel area is different from an area of the second sub-pixel area.

12. The display substrate of claim 1, wherein the pixel electrode further includes
a third connection electrode portion disposed in the second sub-pixel area, and the third connection electrode intersects the first connection electrode portion,
wherein the second connection electrode portion is disposed in the first sub-pixel area, and
wherein the first and second electrode portions extend in different directions from the first, second, and third connection electrode portions and define a plurality of domains.

13. A liquid crystal display panel comprising:
a display substrate including a pixel electrode, the pixel electrode including
a plurality of first electrode portions disposed at a first interval in the first sub-pixel area on the base substrate, the first electrode portion having a first width;
a plurality of second electrode portions disposed at a second interval in the second sub-pixel area on the base substrate, the second electrode portion having a second width, wherein the first width of the first electrode portion is different from the second width of the second electrode portion, or the first interval between adjacent first electrode portions in the first sub-pixel area is different from the second interval between adjacent second electrode portions in the second sub-pixel area, a boundary defined by terminal ends of the first electrode portions in the first sub-pixel area and by terminal ends of the second electrode portions in the second sub-pixel area having a substantially rectangular shape, the terminal ends of the first electrode portions connect opposite sides of the first electrode portions defining the first width, and the terminal ends of the second electrode portions connect opposite sides of the second electrode portions defining the second width;

a first connection electrode portion electrically and directly connected to the first electrode portions and the second electrode portions; and a second connection electrode portion extending in a direction which intersects the first connection electrode portion and does not overlap a storage line, wherein the first and second electrode portions extend in different directions from the first and second connection electrode portions and define a plurality of domains, an opposite substrate facing the display substrate, the opposite substrate including a common electrode; and a liquid crystal layer interposed between the display substrate and the opposite substrate.

14. The liquid crystal display panel of claim 13, wherein the first width of the first electrode portion in the first sub-pixel area is larger than the second width of the second electrode portion in the second sub-pixel area.

15. The liquid crystal display panel of claim 14, wherein the first width is between about 2.5 micrometers to about 8.0 micrometers, and the second width is between about 1 micrometer to about 2.5 micrometers.

16. The liquid crystal display panel of claim 13, wherein the first interval between adjacent first electrode portions in the first sub-pixel area is larger than the second interval between adjacent second electrode portions in the second sub-pixel area.

17. The liquid crystal display panel of claim 16, wherein the pixel electrode further includes a plurality of third electrode portions disposed between the first electrode portion and the second electrode portion that are disposed at a boundary area between the first sub-pixel area and the second sub-pixel area, wherein intervals between the adjacent third electrode portions are smaller than the first interval, and larger than the second interval, wherein the intervals between the adjacent third electrode portions gradually narrow as closer to the second electrode portion disposed at the boundary area between the first sub-pixel area and the second sub-pixel area.

18. The liquid crystal display panel of claim 13, wherein the display substrate further includes a first alignment layer aligning liquid crystal molecules of the liquid crystal layer, and a first cured reactive mesogen layer disposed between the liquid crystal layer and the first alignment layer, the first cured reactive mesogen layer having a pretilt angle, wherein the opposite substrate includes a second alignment layer aligning the liquid crystal molecules of the liquid crystal layer, and a second cured reactive mesogen layer disposed between the liquid crystal layer and the second alignment layer, the second cured reactive mesogen layer having a pretilt angle.

19. The liquid crystal display panel of claim 13, wherein the display substrate further includes a switching device electrically connected to a gate line and a data line, which are substantially perpendicular to each other, wherein the pixel electrode is electrically connected to the drain electrode of the switching device, wherein the first electrode portions are disposed in a first sub-pixel area and the second electrode portions are disposed in a second sub-pixel area.

20. The liquid crystal display panel of claim 19, wherein an area of the first sub-pixel area is different from an area of the second sub-pixel area.

21. The liquid crystal display panel of claim 19, wherein the pixel electrode further includes:

a third connection electrode portion disposed in the second sub-pixel area, and the third connection electrode intersects the first connection electrode portion, wherein the second connection electrode portion is disposed in the first sub-pixel area, and wherein the first and second electrode portions extend in different directions from the first, second, and third connection electrode portions and define a plurality of domains.

* * * * *